United States Patent
Kwang Bae

(10) Patent No.: US 6,728,438 B2
(45) Date of Patent: Apr. 27, 2004

(54) EXTERNALLY CONTROLLABLE WAVEGUIDE TYPE HIGHER ORDER MODE GENERATOR

(75) Inventor: Kim Kwang Bae, Daejeon (KR)

(73) Assignee: Zen Photonics Co., Ltd., Daejeon (KR)

(*) Notice: Subject to any disclaimer, the term of this patent is extended or adjusted under 35 U.S.C. 154(b) by 314 days.

(21) Appl. No.: 09/966,076

(22) Filed: Oct. 1, 2001

(65) Prior Publication Data

US 2004/0052454 A1 Mar. 18, 2004

(30) Foreign Application Priority Data

Oct. 2, 2000 (KR) .................... 10-2000-0058040

(51) Int. Cl.[7] ................................................ G02B 6/14
(52) U.S. Cl. .................................... 385/28; 385/140
(58) Field of Search .............................. 385/2, 8, 27–29, 385/39, 40, 140

(56) References Cited

U.S. PATENT DOCUMENTS 4,737,003 A * 4/1988 Matsumura et al. .......... 385/18
5,841,913 A * 11/1998 Marcuse et al. ............... 385/7

* cited by examiner

*Primary Examiner*—John D. Lee
*Assistant Examiner*—Sarah U Song
(74) *Attorney, Agent, or Firm*—Greenblum & Bernstein, P.L.C.

(57) ABSTRACT

A higher order mode generator includes a straight waveguide having upper and lower cladding layers and a core layer which support higher order modes higher than the $0^{th}$ order. A linear heater is disposed across the waveguide at a tilt angle $\alpha$ with respect to the waveguide. For converting the $0^{th}$ order optical guiding mode into the $m^{th}$ order optical guiding mode, a tilt angle $\alpha$ of the linear heater and the $m^{th}$ order mode propagation angle $\theta_m$ satisfy the condition: $\alpha > \theta_m/2$.

3 Claims, 6 Drawing Sheets

Temperature increase : 0°C

Temperature increase : 30°C

Attenuation characteristic according to the temperature

EXTERNALLY CONTROLLABLE WAVEGUIDE TYPE HIGHER ORDER MODE GENERATOR

FIELD OF THE INVENTION

The present invention relates to a higher order mode generator device capable of converting the $0^{th}$ order fundamental waveguide mode into the higher order waveguide modes through an external control.

BACKGROUND OF THE INVENTION

Combining different orders of waveguide modes in a waveguide type device is very difficult and also has a fundamental problem. If solving these problems, it can be applied to various devices such as a switch or an attenuator. As such passive devices capable of combining the fundamental mode into the higher order modes, only passive devices composed of adiabatic Y-branch type waveguides having different widths have been reported. There has been no device that can control the amount of combination using external voltage or current. In case of using the adiabatic Y-branch type waveguide, fabrication of optical devices such as 2×2 switches and optical attenuators is possible by combining two Y-branches in the form of Mach-Zehnder interferometer. In these cases, however, there are difficulties in the fabrication since the branching angle of a Y-branch is very small, and also thie optical loss is large since the length is lengthened very long.

BRIEF SUMMARY OF THE INVENTION

An object of the present invention is to provide a higher order mode generator device for converting the $0^{th}$ order fundamental waveguide mode into the higher order waveguide modes more than a first order, which has a very simple structure composed of a straight waveguide and an electrode.

Another object of the present invention is to provide a higher order mode generator device which can simplify the structure of an optical device and a driving method thereof.

These and other objects can be accomplished by a higher order mode generator according to the present invention, comprising a linear waveguide including upper and lower cladding layers 2,3 and core layer 1 which support higher order modes higher than the $0^{th}$ order and a linear heater 4 which is disposed across the waveguide at a tilt angle $\alpha$ with respect to the waveguide, wherein for combining the $0^{th}$ order optical guiding mode with the $m^{th}$ order optical guiding mode, a tilt angle $\alpha$ of the heater and the $m^{th}$ order mode propagation angle $\theta_m$ satisfy the condition of $\alpha > \theta_m/2$.

BRIEF DESCRIPTION OF THE DRAWINGS

FIGS. 5a and 5b show the cases when temperature increase of the waveguide by the heater is 0° C. and 30° C., respectively.

DETAILED DESCRIPTION OF THE INVENTION

Figure 1:
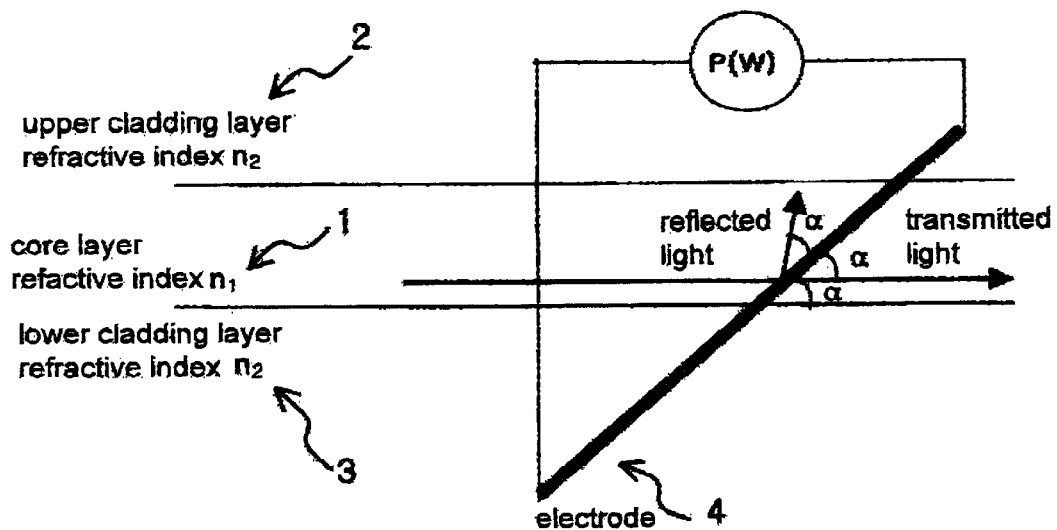
FIG. 1 is a schematic diagram of the inventive higher order mode generator device.

FIG. 1 is a schematic diagram of a higher order mode generator device according to the present invention. The waveguide type optical device, as shown in FIG. 1, includes a multimode waveguide including a straight core layer 1 and cladding layers 2,3 which can support higher order modes higher than the $0^{th}$ order and a linear heater (electrode) 4 which is disposed across the multimode waveguide at a certain tilt angle $\alpha$.

Figure 2:
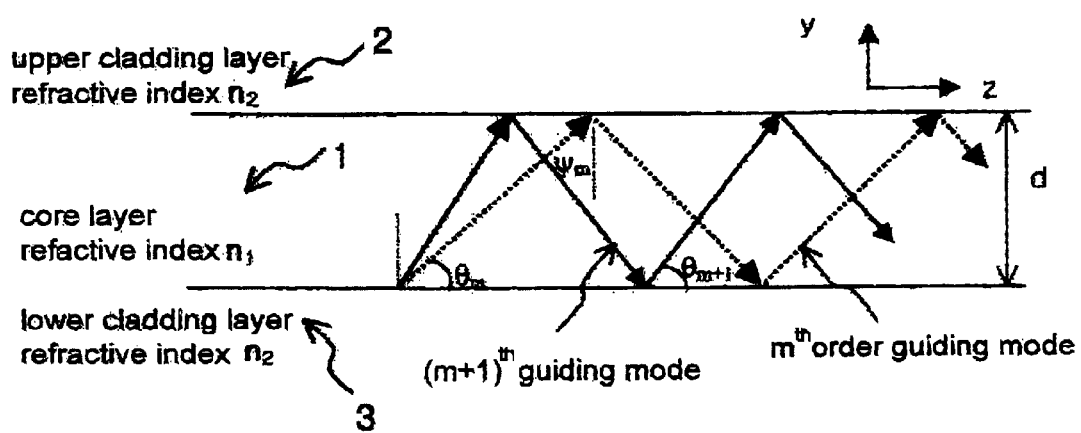
FIG. 2 is a schematic diagram for illustrating the paths of waveguiding light according to the order of modes in the higher order mode generator shown in FIG. 1.

For more detailed description of the higher order mode generator according to the present invention, the optical guiding characteristics in a three-layer waveguide are explained with reference to FIG. 2.

For a light to propagate along a waveguide, the refractive index $n_1$ of the core layer 1 should be larger than those $n_2$ of the cladding layers 2,3 and the light should satisfy the total reflection condition and the standing wave condition in the vertical direction. The total reflection condition is a condition for the light propagating toward each of the cladding layers 2,3 from the core layer 1 in the waveguide to reflect the light entirely at the boundary of the core and cladding layers 1 and 2,3. Accordingly, the incident angle $\psi_m$ against the upper cladding layer 2, which is determined by the $m^{th}$ order mode propagation angle $\theta_m$, should be smaller than the total reflection angle $\psi_c$, which is determined by the refractive index difference of the waveguide, wherein the total reflection angle is defined as follows:

$$\psi_c = \cos^{-1}(n_2/n_1) \quad (1)$$

However, all light which satisfy the total reflection condition are not allowed to propagate along the waveguide but only part of those which satisfy the standing wave condition can propagate along the waveguide.

The standing wave condition in the vertical direction is as follows:

$$k_0 n_1 d \sin(\theta_m) - 2\pi\phi_r = 2\pi m, \ m=0, 1, 2, \quad (2)$$

Herein, d is the thickness of waveguide core layer 1, $k_0 = 2\pi/\lambda_0$ is the wave number vector of light, $\lambda_0$ is the wavelength at vacuum, $\phi_r$ is the phase change of the reflected light at the boundary of core and cladding layers 1 and 2,3, and m is an integer number. m=0 is the $0^{th}$ order fundamental guiding mode, m=1 is a first order guiding mode, and m=2 is a second order guiding mode. Also as shown in FIG. 2, as the order of the waveguide mode becomes higher, the propagation angle becomes larger. The total number of guiding modes in the waveguide is determined by the thickness d of the core layer 1 and the refractive index difference between the core and cladding layers 1 and 2,3, and can be expressed as follows:

$$M = 2 * d/\lambda_0 k (n_1^2 - n_2^2)^{1/2} \quad (3)$$

Figure 3:
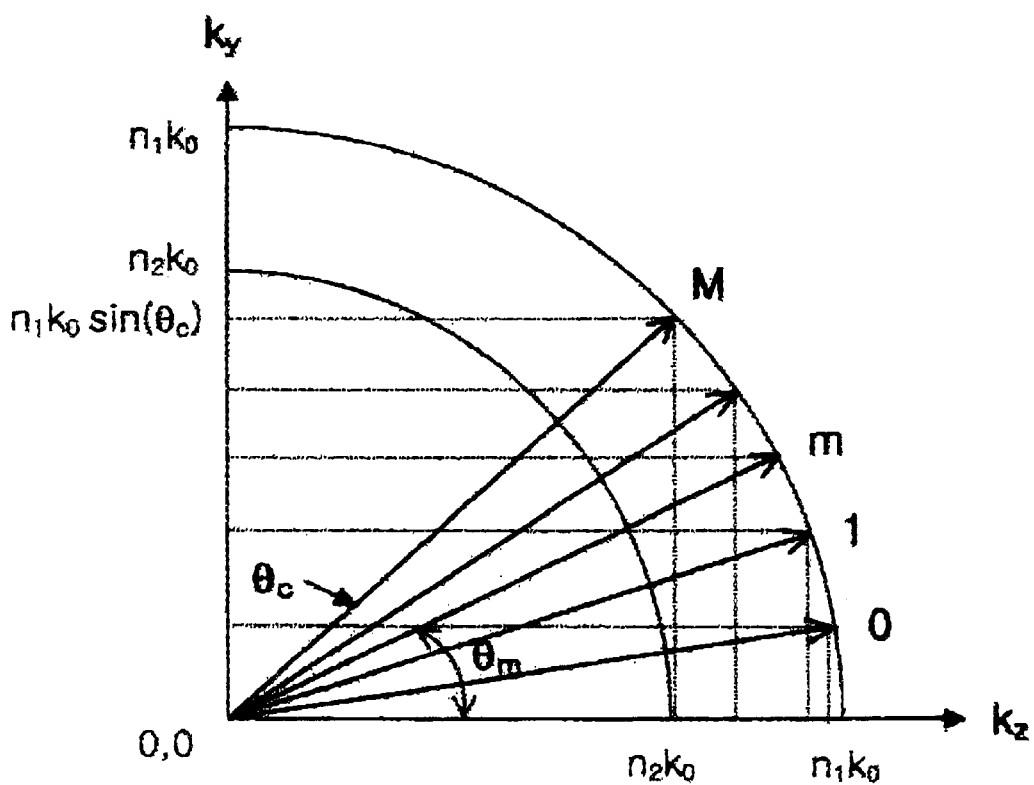
FIG. 3 is a graph showing a relation between the magnitude of wave number vector according to the order of modes and the wave number vectors related to core and cladding layers.

FIG. 3 shows simultaneously all higher order guiding modes, which can be waveguided in a wave number vector plane in order to compare the propagation direction characteristics among guiding modes in the waveguide. The wave number vector in the propagation direction (z-axis) becomes the effective propagation constant of the waveguide and becomes smaller as the guiding mode gets into the higher order mode. That is, as the guiding mode gets into the higher order mode, the light propagation angle $\theta_m$ becomes more largely, so that the light propagation speed becomes more slowly.

Based on the basic principles as mentioned above, the detailed description of the operational principle of the inventive higher order mode generator is as follows:

Firstly, in order to convert the $0^{th}$ order fundamental mode into the $m^{th}$ order guiding mode, the angle between the heater 4 and the waveguide should be $\alpha = \theta_m/2$. When electric power is applied to the heater 4, the temperature of the waveguide region beneath the heater 4 increases, so that the refractive index of the waveguide region increases (for silica) or decreases (for polymer). Therefore, the propagating light is reflected at the boundary of the heater at an angle of $\alpha$ with respect to the heater 4 and propagates at an angle of $2\alpha$ with respect to the waveguide propagation direction. At this time, if the angle $2\alpha$ is same as the propagation angle $\theta_m$, the propagation direction of reflected light coincides with that of the $m^{th}$ order mode and the $0^{th}$ order guiding mode is converted into the $m^{th}$ order guiding mode. And, when the electric power applied to the heater is increased, the temperature of the waveguide beneath the heater increases and thus the amount of change in the waveguide refractive index increases. Therefore, the amount of reflected light increases and so there increases the amount of higher order modes conversion from the $0^{th}$ order mode into the $m^{th}$ order mode.

Figure 4:
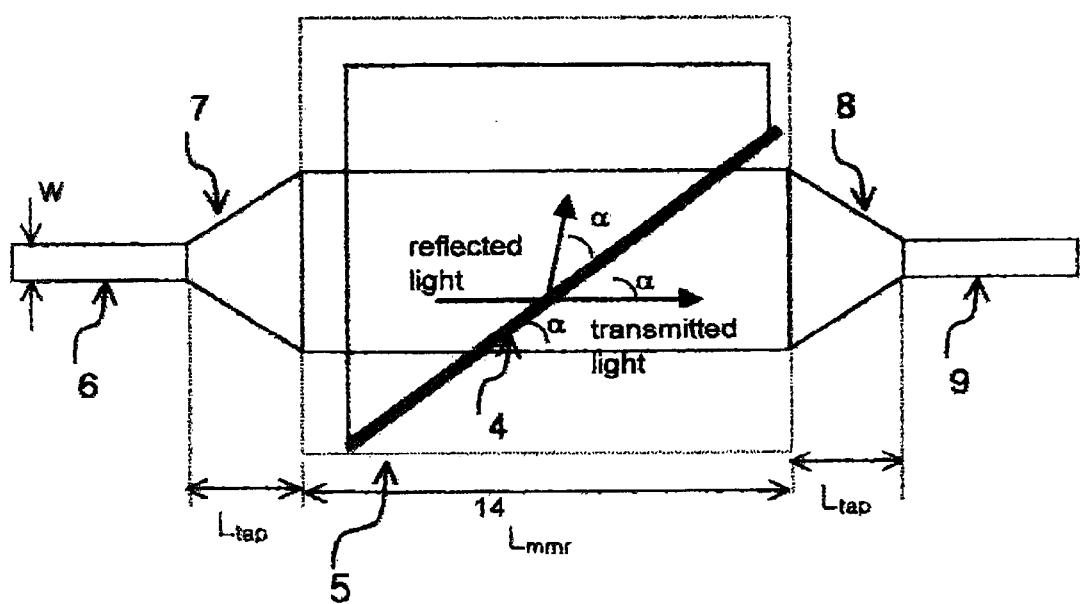
FIG. 4 is a schematic diagram showing a variable optical attenuator as an exemplary embodiment of the inventive higher order mode generator.

FIG. 4 shows the structure of a variable optical attenuator, wherein the input light intensity can be controlled by external electric power, as an exemplary embodiment of an optical device, which can be fabricated utilizing the higher order mode generator according to the present invention. In the present embodiment, polymer materials are used as waveguide materials and, as mentioned above, the polymer has thermo-optic effect which decreases the refractive index as temperature increases.

The operational principle of the variable optical attenuator shown in FIG. 4 can be explained as follows: The eight passing through the single mode waveguide 6 of input port can be incident upon the multimode generator region 5 through the tapered region 7 without any optical power loss. When there is no external electric power applied to the heater 4, the light passing through the multimode generator region 5 passes through the tapered region 8 and single mode waveguide 9 of output port without any optical power loss. Therefore, the light can pass through the device without optical attenuation.

When current flows through the heater, however, the refractive index of the waveguide beneath the heater 4 is decreased proportional to the temperature. Therefore, part of the light propagating beneath the heater is reflected at the heater with an angle of $\alpha$. As a result, the reflected light propagates at an angle of $2\alpha$ with respect to the waveguide propagation direction. If the angle $2\alpha$ of the reflected light is at least larger than the propagation angle of the first order guiding mode of the higher order mode generator, higher order modes will be excited and these higher order modes will be removed at the tapered region 8 and again at the single mode waveguide 9 of output port and results in an attenuation of the input light.

Therefore, if the amount of current flowing through the heater increases, the amount of reflected light intensity increases and thus more attenuation of input light occurs. In the end, the device operates as a variable optical attenuator, wherein the output light intensity can be controlled according to the amount of current (or voltage) flowing through the heater.

Figure 5A:
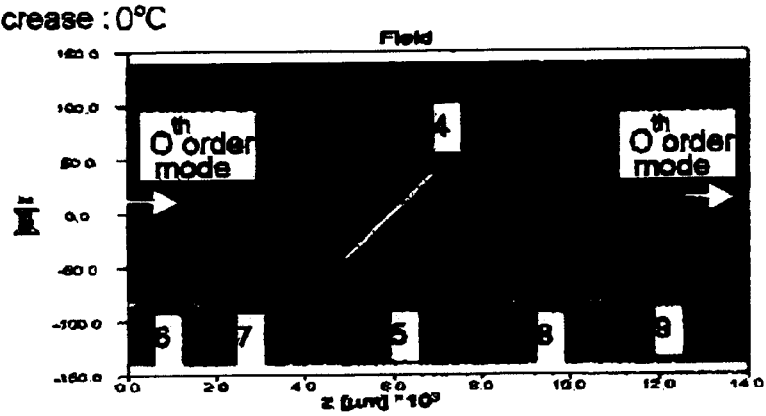
FIGS. 5a and 5b are illustrate the RPM (Beam Propagation Method) simulation results on the embodiment of FIG. 4 for wavelength $\lambda_D$=1.55 um, $n_1$=1.4397, $n_2$=1.4856, d=40 um, $L_{tap}$=3200 um, $L_{mmr}$=3800 um, w=7 um.
Figure 5B:
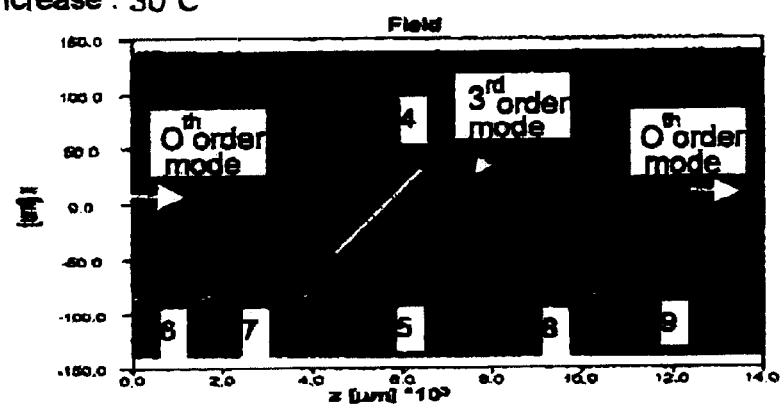
Figure 5C:
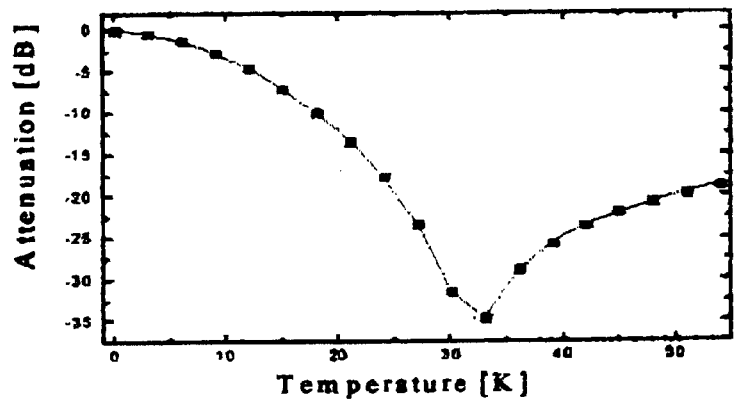
FIG. 5c shows the attenuation characteristics of the waveguide according to the temperature.

FIG. 5 illustrates the BPM simulation results on the waveguide characteristics of a variable optical attenuator shown in FIG. 4. FIGS. 5a and 5b show when temperature increase of the waveguide by the heater 4 are 0° C. and 30° C., respectively. Herein, the thermo-optic coefficient of the waveguide of $-1.2 \times 10^{-4}/°$ C. is used. In the simulation, the width of the input waveguide 6 of 7 um, the length of tapered region $L_{tap}$=3,200 um, the width of a higher order mode generator d=40 um, and the length of the higher order mode generator $L_{mmr}$=3,800 um are used. The refractive indices of the core and cladding layers 1 and 2,3 are $n_1$=1.4856 and $n_2$=1.4937, respectively, at wavelength $\lambda_0$=1.55 um. When there is no increase of temperature, most of the $0^{th}$ order single mode input light is shown to transmit, as the $0^{th}$ order single mode at the output port and only small amount of optical loss are shown to occur at the tapered region 8 of the output port. When temperature increases by 30° C., however, the light is reflected at the boundary of the heater and thereafter the higher order modes are shown to be excited. In this case, it is clearly shown that the most of the light is eliminated at the tapered region 8 and the single mode region 9 of the output port. FIG. 5c shows the simulated results of the attenuation characteristics of the output light power according to the temperature increase beneath the heater in a variable optical attenuator. It is shown that the attenuation over 30 dB occurs at temperature increase of about 35° C.

Figure 6:
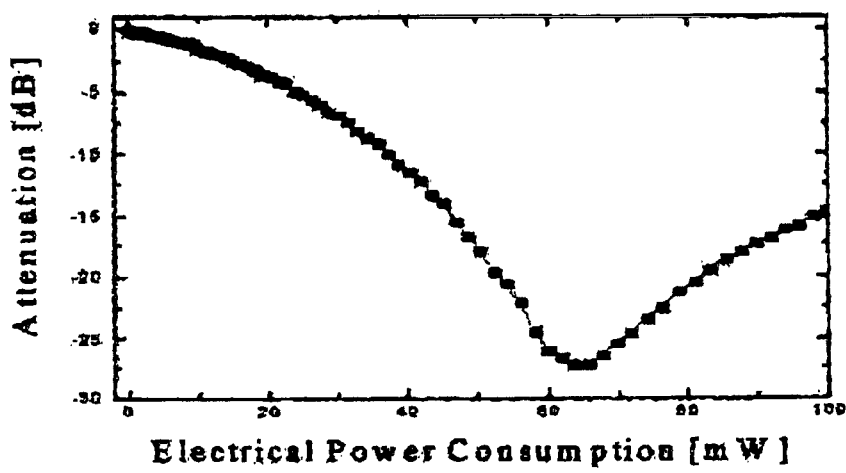
FIG. 6 is to illustrate the experimental results of attenuation characteristics according to the applied electric power measured on a variable optical attenuator of structure shown in FIG. 4, which is fabricated in real.

FIG. 6 shows experimental results on the attenuation characteristics according to the electric power applied to the heater in a real variable optical attenuator fabricated as shown in FIG. 5. Since the temperature change is proportional to the amount of electric power applied to the heater, the experimentally measured results in FIG. 6 show the consistent trend with the simulated results as presented in FIG. 5c.

In conclusion, the present invention is a higher order mode generator wherein the structure is very simple and the fabrication is very easy and therefore it allows easy fabrication of various waveguide type optical devices such as a variable optical attenuator and it also provides advantages in mass production.

The present disclosure relates to subject matter contained in priority Korean Application No. 10-2000-0058040, filed on Oct. 2, 2000, which is herein expressly incorporated by reference in its entirety.

What is claimed is:

1. A higher order mode generator comprises: a straight waveguide including upper and lower cladding layers and core layer which support higher order nodes higher than the $0^{th}$ order and a linear heater which is disposed across the waveguide at a tilt angle $\alpha$ with respect to the waveguide, wherein for converting the $0^{th}$ order optical guiding mode into the $m^{th}$ order optical guiding mode, a tilt angle $\alpha$ of the heater and the $m^{th}$ order mode propagation angle $0^{th}$ satisfy the condition of $\alpha > \theta_m/2$.

2. The higher order mode generator as claimed in claim 1, wherein the core and cladding layers are made from silica or polymer, and wherein an external control is performed by using a refractive index change resulting from a temperature change by flowing current through a linear heater.

3. The higher order mode generator as claimed in claim 1, wherein the waveguide materials is made from $LiNbO_3$ or electro-optic polymer and an external control is performed by using a refractive index change resulting from a voltage applied to the linear heater.

* * * * *